United States Patent
Sadilek et al.

(10) Patent No.: US 11,381,092 B2
(45) Date of Patent: Jul. 5, 2022

(54) SYSTEMS AND METHODS FOR CHARGING AND DISCHARGING ACTIVE POWER LINK MODULES IN DIRECT CURRENT POWER SYSTEMS

(71) Applicant: General Electric Company, Schenectady, NY (US)

(72) Inventors: Tomas Sadilek, Schenectady, NY (US); Rui Zhou, Niskayuna, NY (US); Zhi Zhou, Schenectady, NY (US); Philip Michael Cioffi, Schaghticoke, NY (US); Dong Dong, Schenectady, NY (US)

(*) Notice: Subject to any disclaimer, the term of this patent is extended or adjusted under 35 U.S.C. 154(b) by 193 days.

(21) Appl. No.: 15/253,091

(22) Filed: Aug. 31, 2016

(65) Prior Publication Data
US 2018/0205240 A1   Jul. 19, 2018

(51) Int. Cl.
*H02J 7/00* (2006.01)
*H02M 7/49* (2007.01)
(Continued)

(52) U.S. Cl.
CPC ............ *H02J 7/0016* (2013.01); *H02J 1/10* (2013.01); *H02J 3/32* (2013.01); *H02J 7/0018* (2013.01); *H02J 7/345* (2013.01); *H02M 7/217* (2013.01); *H02M 7/49* (2013.01); *H02M 7/539* (2013.01); *H02J 7/342* (2020.01); *H02J 2207/20* (2020.01); *H02M 1/0077* (2021.05);
(Continued)

(58) Field of Classification Search
CPC .. H02J 7/0016; H02J 7/345; H02J 1/10; H02J 3/32; H02M 7/217; H02M 7/49; H02M 7/539

USPC .......................................................... 320/107
See application file for complete search history.

(56) References Cited

U.S. PATENT DOCUMENTS 5,986,909 A   11/1999   Hammond et al.
6,222,284 B1   4/2001   Hammond et al.
(Continued)

FOREIGN PATENT DOCUMENTS

EP   2 608 347 A2   6/2013

OTHER PUBLICATIONS

International Search Report and Written Opinion issued in connection with corresponding PCT Application No. PCT/US17/29862, dated Jul. 26, 2017.

*Primary Examiner* — Richard Isla
*Assistant Examiner* — Dung V Bui
(74) *Attorney, Agent, or Firm* — Wood IP Law

(57) ABSTRACT

A modular power converter system includes a plurality of active power link modules (APLMs) coupled to each other, each APLM having a plurality of switching devices including first and second switching devices coupled to each other, and at least one first-type energy storage device (ESD) coupled in parallel with both of the first and second switching devices, the first-type ESD configured to induce a first direct current (DC) voltage. The system also includes a plurality of relays coupled to the first-type ESD, and a charge controller coupled to at least one APLM of the plurality of APLMs and coupled to at least one of an electrical power source and a discharge circuit. The charge controller is configured to alternately charge and discharge the first-type ESD in response to a plurality of switching states including switching states of the plurality of switching devices and the plurality of relays.

23 Claims, 8 Drawing Sheets

(51) Int. Cl.
  *H02M 7/217* (2006.01)
  *H02M 7/539* (2006.01)
  *H02J 3/32* (2006.01)
  *H02J 7/34* (2006.01)
  *H02J 1/10* (2006.01)
  *H02M 7/66* (2006.01)
  *H02M 1/00* (2006.01)
  *H02M 1/32* (2007.01)
  *H02M 7/483* (2007.01)

(52) U.S. Cl.
  CPC .......... *H02M 1/322* (2021.05); *H02M 7/4835* (2021.05); *H02M 7/66* (2013.01)

(56) References Cited

U.S. PATENT DOCUMENTS

| | | | |
|---|---|---|---|
| 6,317,345 B1* | 11/2001 | Hayward | H02M 3/1584 363/65 |
| 8,922,054 B2 | 12/2014 | Sihler et al. | |
| 9,190,932 B2 | 11/2015 | Harnefors et al. | |
| 9,793,850 B2* | 10/2017 | Feuerstack | B60L 53/24 |
| 2009/0251100 A1 | 10/2009 | Incledon et al. | |
| 2011/0075315 A1* | 3/2011 | Dickerhoof | B60L 3/04 361/190 |
| 2012/0086390 A1 | 4/2012 | Lim et al. | |
| 2013/0307480 A1 | 11/2013 | Boggs et al. | |
| 2014/0078797 A1 | 3/2014 | Mihalache | |
| 2014/0167515 A1* | 6/2014 | Feuerstack | H01M 10/44 307/81 |
| 2014/0226377 A1* | 8/2014 | Goetz | H02M 3/158 363/65 |
| 2014/0312828 A1* | 10/2014 | Vo | H02J 7/342 320/103 |
| 2014/0343776 A1* | 11/2014 | Ang | H02J 7/022 701/22 |
| 2014/0375280 A1* | 12/2014 | Jung | H02J 7/00308 320/163 |
| 2015/0108844 A1 | 4/2015 | Zhou et al. | |
| 2015/0155712 A1 | 6/2015 | Mondal | |
| 2015/0207434 A1 | 7/2015 | Wang et al. | |
| 2015/0333660 A1* | 11/2015 | Kim | H02M 1/32 363/123 |
| 2015/0357931 A1* | 12/2015 | Oates | H02M 7/493 363/89 |
| 2016/0020705 A1 | 1/2016 | Dong et al. | |
| 2016/0105109 A1* | 4/2016 | Jasim | H02M 3/158 323/271 |
| 2016/0141894 A1* | 5/2016 | Beaston | H02J 7/342 320/103 |
| 2016/0207403 A1* | 7/2016 | Iida | H02J 7/00 |

* cited by examiner

US 11,381,092 B2

SYSTEMS AND METHODS FOR CHARGING AND DISCHARGING ACTIVE POWER LINK MODULES IN DIRECT CURRENT POWER SYSTEMS

STATEMENT REGARDING FEDERALLY SPONSORED RESEARCH & DEVELOPMENT

This invention was made with Government support under contract number N00014-14-C-0103 awarded by the United States Office of Naval Research. The Government may have certain rights in this invention.

BACKGROUND

The field of the disclosure relates generally to electrical power conversion and electrical energy storage systems, and, more specifically, to systems and methods for charging and discharging active power link modules (APLMs) in direct current (DC) power systems.

In at least some known systems and methods for charging and discharging energy storage devices (ESDs) in DC power systems, electrical load supportive functions are interrupted to remove and replace discharged and faulty ESDs for maintenance and replacement. ESDs such as high energy ultracapacitors provide several benefits in DC power systems, but in such known systems and methods, charging and discharging them is inconvenient and places supported electrical loads out of service for extended periods of time.

Also, in at least some known systems and methods for charging and discharging ESDs in DC power systems, charge and discharge functionality and control is not integrated on a system-wide basis. Such known systems and methods thus require operators to utilize separate components for charging and discharging ESDs which increases operational downtime and maintenance costs, and heightens risk of equipment damage. Further, such known systems and methods lack modularity including simply and quickly implementable least replaceable units (LRUs) that are configurable in widely varying system designs in a number of voltage levels to suit particular applications.

BRIEF DESCRIPTION

In one aspect, a modular power converter system is provided. The modular power converter system includes a plurality of active power link modules (APLMs) coupled to each other. Each APLM of the plurality of APLMs includes a plurality of switching devices including a first switching device and a second switching device coupled to each other in electrical series. Each APLM of the plurality of APLMs also includes at least one first-type energy storage device (ESD) coupled in electrical parallel with both of the first switching device and the second switching device. The at least one first-type ESD is configured to induce a first direct current (DC) voltage. Each APLM of the plurality of APLMs further includes a plurality of relays coupled to the at least one first-type ESD. The modular power converter system also includes a charge controller coupled to at least one APLM of the plurality of APLMs and coupled to at least one of an electrical power source and a discharge circuit. The charge controller is configured to alternately charge and discharge the at least one first-type ESD in response to a plurality of switching states including switching states of the plurality of switching devices and switching states of the plurality of relays.

In another aspect, a method of operating a modular power converter system is provided. The modular power converter system includes a plurality of APLMs coupled to each other. Each APLM of the plurality of APLMs includes a plurality of relays, a plurality of switching devices, and at least one first-type ESD coupled in electrical parallel with the plurality of switching devices. The at least one first-type ESD is configured to induce a first DC voltage. The method includes determining, with a sensor coupled to the plurality of switching devices, an operational status of at least one APLM of the plurality of APLMs, the operational status including a functional status and a non-functional status. The method also includes establishing, with a switching controller coupled to the plurality of switching devices and the plurality of relays, a plurality of switching states including switching states of the plurality of switching devices and switching states of the plurality of relays in response to the operational status. The method further includes discharging, with a charge controller coupled to a discharge circuit and the plurality of relays, the at least one first-type ESD of at least one respective APLM of the plurality of APLMs having the non-functional status to a voltage less than the first DC voltage by a predetermined amount. The method also includes replacing the at least one respective APLM having the non-functional status with at least one replacement APLM having the functional status.

In yet another aspect, a method of assembling a modular power converter system is provided. The method includes coupling a plurality of APLMs to each other. Each APLM of the plurality of APLMs includes a plurality of switching devices, a plurality of relays, and at least one first-type ESD coupled in electrical parallel with both of the plurality of switching devices and the plurality of relays. The method also includes coupling a charge controller to the plurality of relays and to at least one of an electrical power source and a discharge circuit. The method further includes coupling at least one second-type ESD in electrical parallel with the plurality of APLMs. The method also includes configuring the charge controller to alternately charge and discharge the at least one first-type ESD in response to a plurality of switching states including switching states of the plurality of switching devices and switching states of the plurality of relays, where each APLM of the plurality of APLMs is configured to facilitate detachable electrical coupling to the modular power converter system.

DRAWINGS

These and other features, aspects, and advantages of the present disclosure will become better understood when the following detailed description is read with reference to the accompanying drawings in which like characters represent like parts throughout the drawings, wherein.

Figure 1:
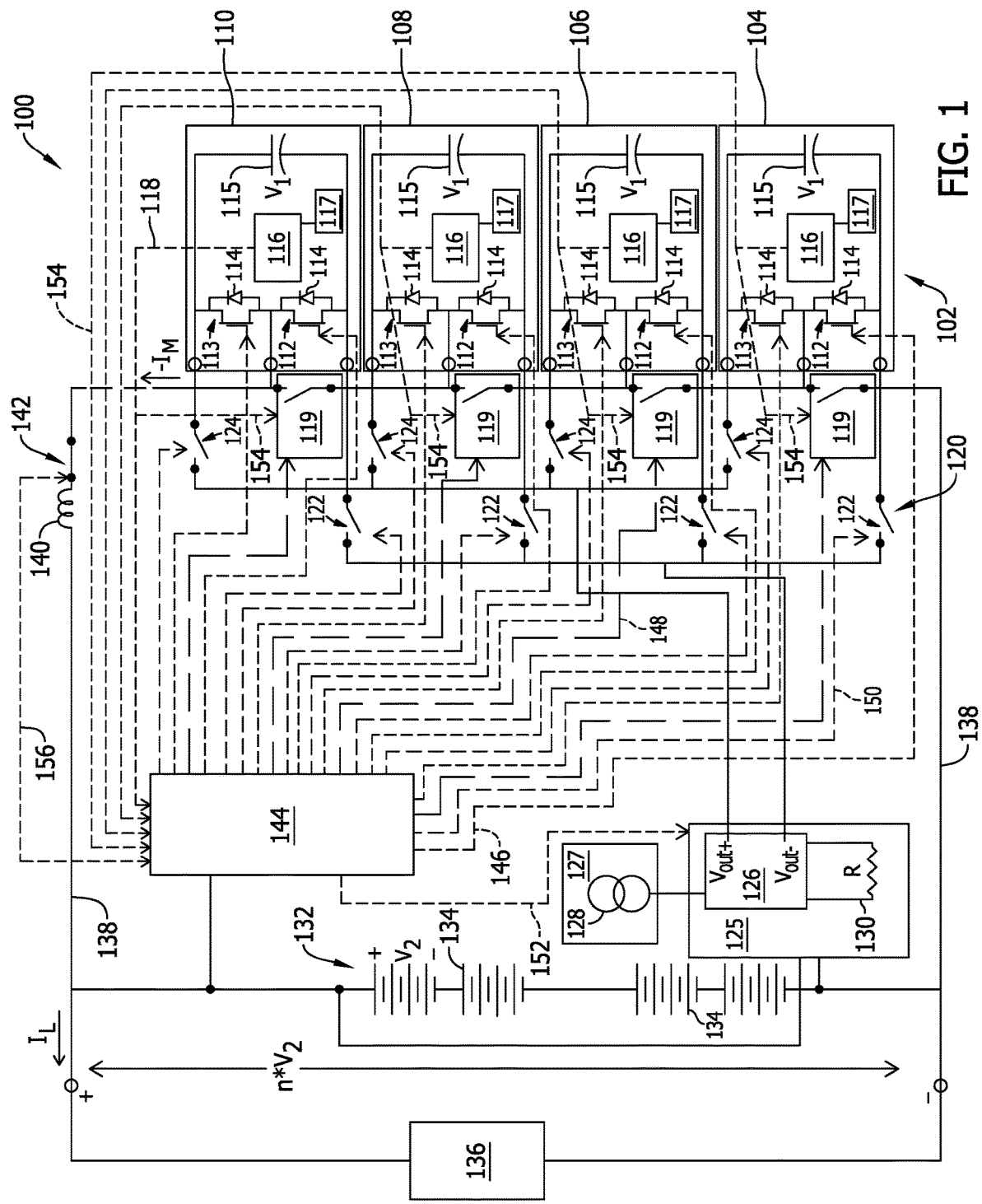
FIG. 1 is a schematic diagram of an exemplary embodiment of a modular power converter system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients, and servers.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods for charging and discharging active power link modules (APLMs) in direct current (DC) power systems described herein enable a reduction in operational downtime of electrical load devices supported by energy storage devices (ESDs), e.g., ultracapacitors, relative to known systems. The embodiments described therein also provide simplified and low cost maintenance and operation of DC power systems. Further, the embodiments described herein further enable integration of ESD charging and discharging functionality and control on a system-wide basis to minimize the number of separate components and steps required by users, and reduce the risk of equipment damage. The systems and methods for charging and discharging APLMs in DC power systems described herein also provide modularity including simply and quickly implementable least replaceable units (LRUs) that are configurable in widely varying designs in a number of voltage levels to suit particular applications.

FIG. 1 is a schematic diagram of an exemplary embodiment of a modular power converter system 100. In the exemplary embodiment, modular power converter system 100 includes a plurality of APLMs 102 coupled to each other. Plurality of APLMs 102 includes a first APLM 104, a second APLM 106, a third APLM 108, and fourth APLM 110. Each APLM 102 of plurality of APLMs 102 includes a first switching device 112 and a second switching device 113 coupled to each other in electrical series. First switching device 112 and second switching device 113 are embodied in an insulated-gate bipolar transistors (IGBTs). In other embodiments, not shown, at least one of first switching device 112 and second switching device is embodied in at least one of an integrated gate commutated thyristor, a non-linear controllable resistor, a varistor, and a transistor other than IGBT-type including, without limitation, a metal-oxide semiconductor field-effect transistor (MOSFET), an injection enhanced gate transistor, a junction gate field-effect transistor (JFET), a bipolar junction transistor (BJT), and combinations thereof. These devices can be made of at least one of silicon (Si) and wide bandgap materials such as silicon carbide (SiC) and gallium nitride (GaN). An antiparallel diode 114 is coupled in electrical parallel to each of first switching device 112 and second switching device 113. Each APLM 102 of plurality of APLMs 102 also includes at least one first-type ESD 115 coupled in electrical parallel with both of first switching device 112 and second switching device 113.

Also, in the exemplary embodiment, first switching device 112 and second switching device 113 are configured to maintain a plurality of controlled switching states (i.e., at least one of on versus off, open versus closed, and conducting versus non-conducting) in response to a control scheme, as further described below. First-type ESD 115 is configured to induce a first DC voltage ($V_1$). First-type ESD 115 is embodied in an ultracapacitor. In other embodiments, not shown, first-type ESD 115 is embodied in at least one of a battery, a film capacitor, an electrolytic capacitor, and a fuel cell.

Further, in the exemplary embodiment, at least one APLM 102 of plurality of APLMs 102 includes at least one sensor 116 coupled to at least one of first-type ESD 115, first switching device 112, and second switching device 113. Sensor 116 is configured to detect at least one of a charge status (i.e., state of charge) of first-type ESD 115 and an operational status of at least one of first switching device 112 and second switching device 113. The operational status of first switching device 112 and second switching device 113 includes a functional status (e.g., capable of alternately switching on and off to enable a flow of electrical current therethrough in a controlled manner) and a non-functional status (e.g., not capable of alternately switching on and off to enable a flow of electrical current therethrough in a controlled manner). The charge status of first-type ESD 115 includes a charged status (e.g., a state of charge that is at least one of substantially equal a predetermined state of charge and greater than the predetermined state of charge) and a discharged status (e.g., a state of charge that is less than the predetermined state of charge). Thus, in modular power converter system 100, when at least one APLM 102 of plurality of APLMs 102 has at least one of first switching device 112 and second switching device 113 having the non-functional status, the respective APLM 102 also has the non-functional status. Likewise, when at least one APLM 102 of plurality of APLMs 102 has first-type ESD 115 having the discharged status, the respective APLM 102 also has the discharged status.

Furthermore, in the exemplary embodiment, at least one APLM 102 of plurality of APLMs 102 includes at least one indicator 117 coupled to sensor 116. Indicator 117 is configured to facilitate distinguishing between at least one respective APLM 102 of plurality of APLMs 102 having at least one of the functional status and the charged status and at least one respective APLM 102 of plurality of APLMs 102 having at least one of the non-functional status and the discharged status. Indicator 117 is embodied in a status signal 118 having a first value when the respective APLM 102 has at least one of the functional status and the charged status, and a second value different from the first value when the respective APLM 102 has at least one of the non-functional status and the discharged status. In other embodiments, not shown, in additional to status signal 118, indicator 117 is also configured to effect other indications to users of modular power converter system 100 including, without limitation, a visual lighted display, an audible alarm, and a human readable message including, without limitation, transmitted from APLM 102 to a human machine interface (HMI) such as a display, not shown, coupled to APLM 102.

Moreover, in the exemplary embodiment, modular power converter system 100 includes a bypass switch 119 coupled in electrical parallel with at least one of first switching device 112 and second switching device 113. Bypass switch 119 is configured to alternately electrically couple and electrically isolate at least one APLM 102 of plurality of APLMs 102 to and from, respectively, modular power converter system 100. Bypass switch 119 is also configured to maintain a plurality of controlled bypass switching states (i.e., at least one of on versus off, open versus closed, and conducting versus non-conducting) in response to the control scheme described below. As such, plurality of switching states in modular power converter system 100 also includes plurality of bypass switching states. For example, and without limitation, bypass switch 119 further coupled to sensor 116 and when bypass switch 119 receives status signal 118 having the first value indicating that the respective APLM 102 has at least one of the functional status and the charged status, bypass switch 119 is maintained in an operational status that disables flow of electrical current therethrough (e.g., an open state of operation of bypass switch 119). However, when bypass switch 119 receives status signal 118 having the second value indicating that the respective APLM 102 has at least one of the non-operational status and the discharged status, bypass switch 119 is maintained in an operational status that enable flow of electrical current therethrough (e.g., a closed state of operation of bypass switch 119).

Also, in the exemplary embodiment, modular power converter system 100 includes a plurality of relays 120 coupled to first-type ESD 115. Plurality of relays 120 includes a first relay 122 coupled to a first terminal of first-type ESD 115 proximate first switching device 112 and a second relay 124 coupled to a second terminal of first-type ESD 115 proximate second switching device 113. Modular power converter system 100 also includes a charger controller 125. Charger controller 125 includes a bi-directional DC-to-alternating current (AC) converter 126 coupled to at least one APLM 102 of plurality of APLMs 102 through plurality of relays 120. For example, and without limitation, a positive terminal (denoted "$V_{out+}$" in FIG. 1) of bi-directional DC-to-AC converter 126 is coupled to second terminal of first-type ESD 115 through second relay 124, and a negative terminal (denoted "$V_{out-}$" in FIG. 1) of bi-directional DC-to-AC converter 126 is coupled to first terminal of first-type ESD 115 through first relay 122.

Charge controller 125 is coupled to at least one of an electrical power source 127 (e.g., a utility grid 128 supplying AC electrical power) and a discharge circuit 130 (e.g., a resistive electrical circuit such as a power resistor bank having a resistance denoted as R in FIG. 1). Charge controller 125 is configured to alternately charge and discharge first-type ESD 115 in response to plurality of switching states of first switching device 112, second switching device 113, and plurality of relays 120. Modular power converter system 100 includes a plurality of second-type ESDs 132. Each second-type ESD 132 of plurality of second-type ESDs 132 is embodied in a battery 134 configured to induce a second DC voltage ($V_2$). In other embodiments, not shown, each second-type ESD 132 of plurality of second-type ESDs 132 is embodied in at least one of an ultracapacitor, a film capacitor, an electrolytic capacitor, and a fuel cell. At least one second-type ESD 132 is coupled in electrical parallel with plurality of APLMs 102 through a DC bus 138. Where a plurality of second-type ESDs 132 are coupled together in electrical series, an effective value of $V_2$ (i.e., the voltage of DC bus 138) is substantially equal to a number (n) of second-type ESDs 132 multiplied by the value of $V_2$ of each second-type ESD 132 of plurality of second—the value of $V_2$ of each second-type ESD 132 of plurality of second-type ESDs 132 (i.e., $n*V_2$). Charger controller 125 is also coupled to the at least one second-type ESD 132 and is further configured to detect a state of charge thereof and alternately charge and discharge second-type ESD 132.

Further, in the exemplary embodiment, modular power converter system 100 also includes at least one electrical load device 136 coupled in electrical parallel through the DC bus 138 with at least one of plurality of APLMs 102 and the at least one second-type ESD 132. DC bus 138 includes at least one series-coupled inductor 140 and a series-coupled main power switch 142. Modular power converter system 100 includes a switching controller 144 coupled to first switching device 112, second switching device 113, bypass switch 119, plurality of relays 120, and to sensor 116 in each APLM 102 of plurality of APLMs 102. Switching controller 144 is configured to transmit at least one switch control signal (e.g., switch control signal 146, bypass control signal 148, and relay control signal 150). Switching controller 144 thereby alternately opens and closes (i.e., enables an alternate transition between a conducting and a non-conducting state, respectively) at least one of bypass switch 119, first switching device 112, and second switching device 113. Switching controller 144 thus facilitates maintaining plurality of switching states in a controlled manner through the control scheme described below. Switching controller 144 is also configured to alternately energize and de-energize plurality of relays 120 to further facilitate their maintaining plurality of switching states in a controlled manner through the control scheme.

Switching controller 144 is also coupled to charge controller 125 in the exemplary embodiment. Switching controller 144 is further configured to transmit at least one charge control signal 152 to charge controller 125 to facilitate alternately charging and discharging first-type ESD 115 in response to plurality of switching states. Also, in the exemplary embodiment, by switching controller 144 is also coupled to sensor 116. Receipt of status signal 118 by switching controller 144 facilitates switching controller 144 determining a control scheme based on at least one of status of charge of first-type ESD 115, status of charge of second-type ESD 132 (i.e., as indicated by status signal 118), and operational parameters of electrical load device 136 (e.g., load current $I_L$). The control scheme includes a timing of switching controller 144 alternately transmitting at least one of switch control signal 146, bypass control signal 148, and relay control signal 150, as further shown and described below. Switching controller 144 is further coupled to bypass switch 119 in the exemplary embodiment. Switching controller 144 is also configured to transmit a bypass switch control signal 154 to bypass switch 119 to alternately open and close bypass switch 119 in a controlled manner including, without limitation, in response to the value of status signal 118 received by switching controller 144 from sensor 116. Switching controller 144 is further configured to transmit a main power switch control signal 156 to main power switch 142 to facilitate alternately closing and opening main power switch 142 in a controlled manner to, for example, and without limitation, electrically isolate and electrically couple, respectively, plurality of APLMs 102 to and from, respectively, at least one of second-type ESD 132 and electrical load device 136.

Charge controller 125 is further configured to maintain first-type ESD 115 at a voltage substantially equal to $V_1$ including, without limitation, within a predetermined range of voltages (e.g., a predetermined $V_1$ voltage tolerance). Charge controller 125 is also configured to maintain second-type ESD 132 at voltage substantially equal to $V_2$ including, without limitation, within a predetermined range of voltages (e.g., a predetermined $V_2$ voltage tolerance). Charge controller 125 is further configured to charge first-type ESD 115 to a voltage substantially equal to $V_1$ upon the voltage of first-type ESD 115 falling below $V_1$ by a predetermined amount. Charge controller 125 is also configured to charge second-type ESD 132 to a voltage substantially equal to $V_2$ upon the voltage of second-type ESD 132 falling below $V_2$ by a predetermined amount. Charge controller 125 is further configured to discharge first-type ESD 115 to a predetermined voltage less than $V_1$ (e.g., to facilitate at least one of removal and replacement of the respective APLM 102 from modular power converter system 100). Charge controller 125 is also configured to discharge second-type ESD 132 to a predetermined voltage less than $V_2$ (e.g., to facilitate at least one of removal and replacement of the respective second-type ESD 132 from modular power converter system 100).

In operation, in the exemplary embodiment, first switching device 112 and second switching device 113, along with first-type ESD 115, provide modular multi-level converter (MMC)-like power electronics integrated into each APLM 102 of plurality of APLMs 102 in modular power converter system 100. The flow of a module current $I_M$ and the direction in which $I_M$ flows, i.e., $I_M$ versus $-I_M$, through plurality of APLMs 102 is controlled via the timing of switching states of first switching device 112 and second switching device 113, as implemented by switching controller 144. Switching controller 144 thus facilitates maintaining a desired charging or discharging state of first-type ESD 115, and thereby the proportion of electrical power supplied to DC bus 138 by plurality of APLMs 102. For example, and without limitation, maintenance of bypass switch 119 and first switching device 112 open, and second switching device 113 closed enables current flow in the $-I_M$ direction and facilitates discharging of first-type ESD 115 to support, e.g., transient power requirements of electrical load device 136. On the other hand, maintenance of bypass switch 119 and second switching device 113 open, and first switching device 112 closed enables current flow in the $+I_M$ direction, i.e., opposite the $-I_M$ direction, and facilitates at least one of maintaining first-type ESD 115 at a substantially constant voltage and charging of first-type ESD 115 (as shown and described below with reference to FIGS. 4 and 5). To supply $I_L$ to electrical load device 136 at an average power requirement, switching controller 144 alternately opens and closes both of first switching device 112 and second switching device 113 at a predetermined frequency and duty cycle to maintain an efficient power and energy balance between first-type ESD 115 and second-type ESD 132, thereby facilitating efficient operation of modular power converter system 100.

Also, in operation, switching controller 144 facilitates determining the operational status and the charge status of each APLM 102 of plurality of APLMs 102. A respective switching of plurality of switching states of bypass switch 119 is based on at least one of the operational status and the charge status. Bypass switch 119 under control of switching controller 144 thereby alternately electrically couples (i.e., when bypass switch 119 is open) and electrically isolates (i.e., when bypass switch 119 is closed) at least one respective APLM 102 having at least one of the non-function operation status and a charge status other than the charged status from modular power converter system 100. APLM 102, bypass switch 119, and switching controller 144, along with the other features and components of modular power converter system 100 thus provides inherent redundancy, fault tolerance, and continuity of operation in the event of malfunction of at least one APLM 102, including, without limitation, a malfunction of at least one of first-type ESD 115, first switching device 112, and second switching device 113.

Figure 2:
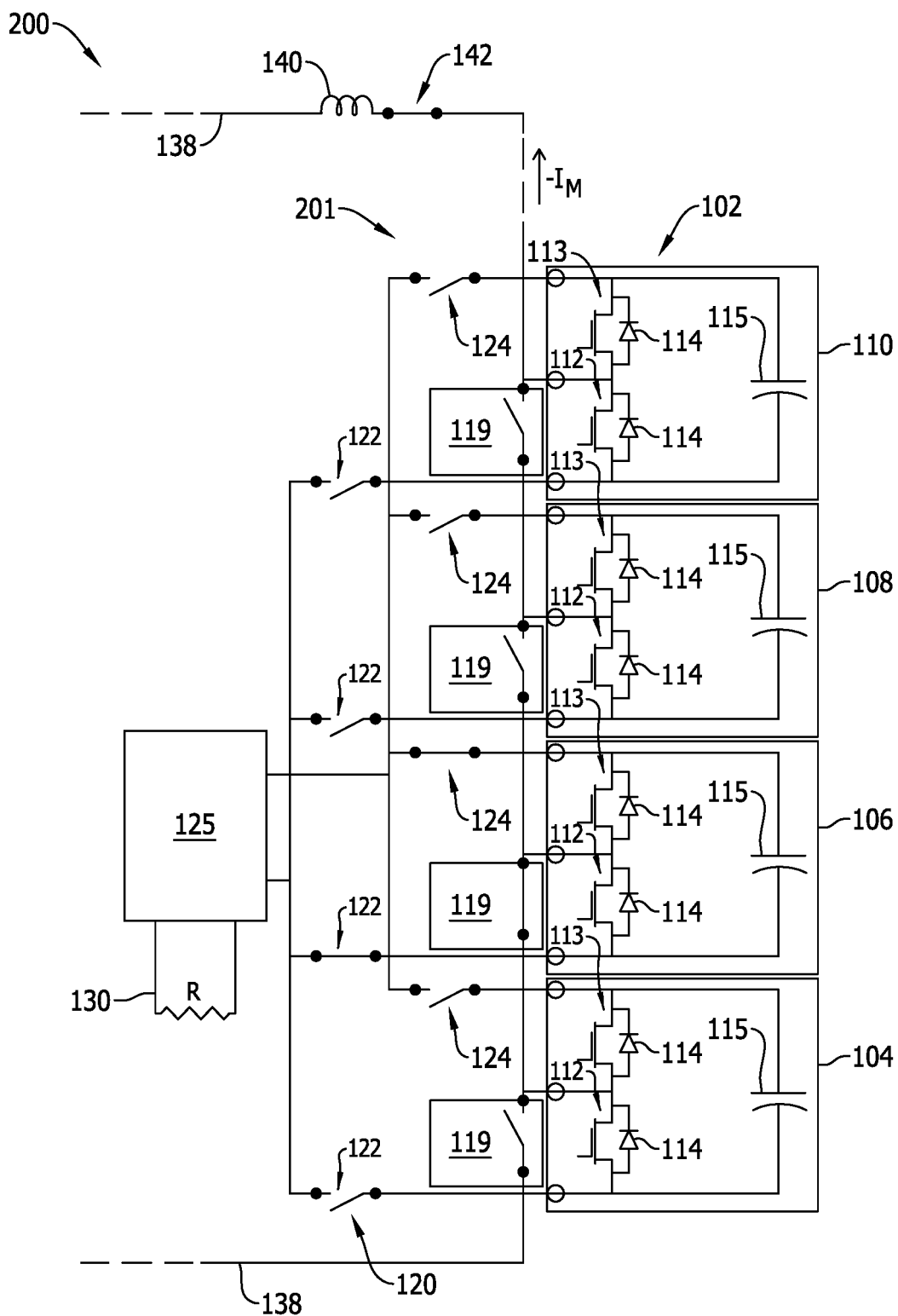
FIG. 2 is a schematic diagram of an exemplary embodiment of an active power link module (APLM) string that may be used with the modular power converter system shown in FIG. 1.

FIG. 2 is a schematic diagram of an exemplary embodiment of APLM string 200 that may be used with modular power converter system 100 (shown in FIG. 1). In the exemplary embodiment, first APLM 104, third APLM 108, and fourth APLM 110 have the functional operational status and the charged charge status. Second APLM 102 has at least one of the non-functional status and the discharged status, as determined by sensor 116 as shown and described above with reference to FIG. 1. Switching controller 144, not shown, maintains main power switch 142 in the closed position (i.e., enabling flow of electrical current through main power switch 142) and thereby electrically coupling plurality of APLMs 102 to modular power converter system 100. Switching controller 144 also maintains bypass switch 119 of first APLM 104, third APLM 108, and fourth APLM 110 in an open position (i.e., disabling flow of electrical current through bypass switch 119) and thereby electrically coupling each of first APLM 104, third APLM 108, and fourth APLM 110 to modular power converter system 100. Switching controller 144 further maintains first relay 122 and second relay 124 of each of first APLM 104, third APLM 108, and fourth APLM 110 in an open position (i.e., in a de-energized state which disables flow of electrical current through both of first relay 122 and second relay 124) thereby electrically isolating each of first APLM 104, third APLM 108, and fourth APLM 110 from charge controller 125.

Also, in the exemplary embodiment, switching controller 144 maintains bypass switch 119 of second APLM 106 in the closed position to electrically isolate second APLM 106 from APLM string 200. Switching controller 144 also maintains first relay 122 and second relay 124 of second APLM 106 in a closed position (i.e., in an energized state which enables flow of electrical current through both of first relay 122 and second relay 124) thereby electrically coupling second APLM 102 to charge controller 125. Charge controller 125 discharges first-type ESD 115 of second APLM 102 through dissipating the electrical energy thereof through discharge circuit 130 including, without limitation, under the control scheme implemented using switching controller 144. Charge controller 125 discharges first-type ESD 115 of second APLM 106 to a voltage less than $V_1$ by a predetermined amount. Discharging first-type ESD 115 of second APLM 102 having at least one of the non-functional status and the discharged status facilitates removal of second APLM 102 from APLM string 200 and modular power converter system 100, as shown and described below with reference to FIG. 3.

Figure 3:
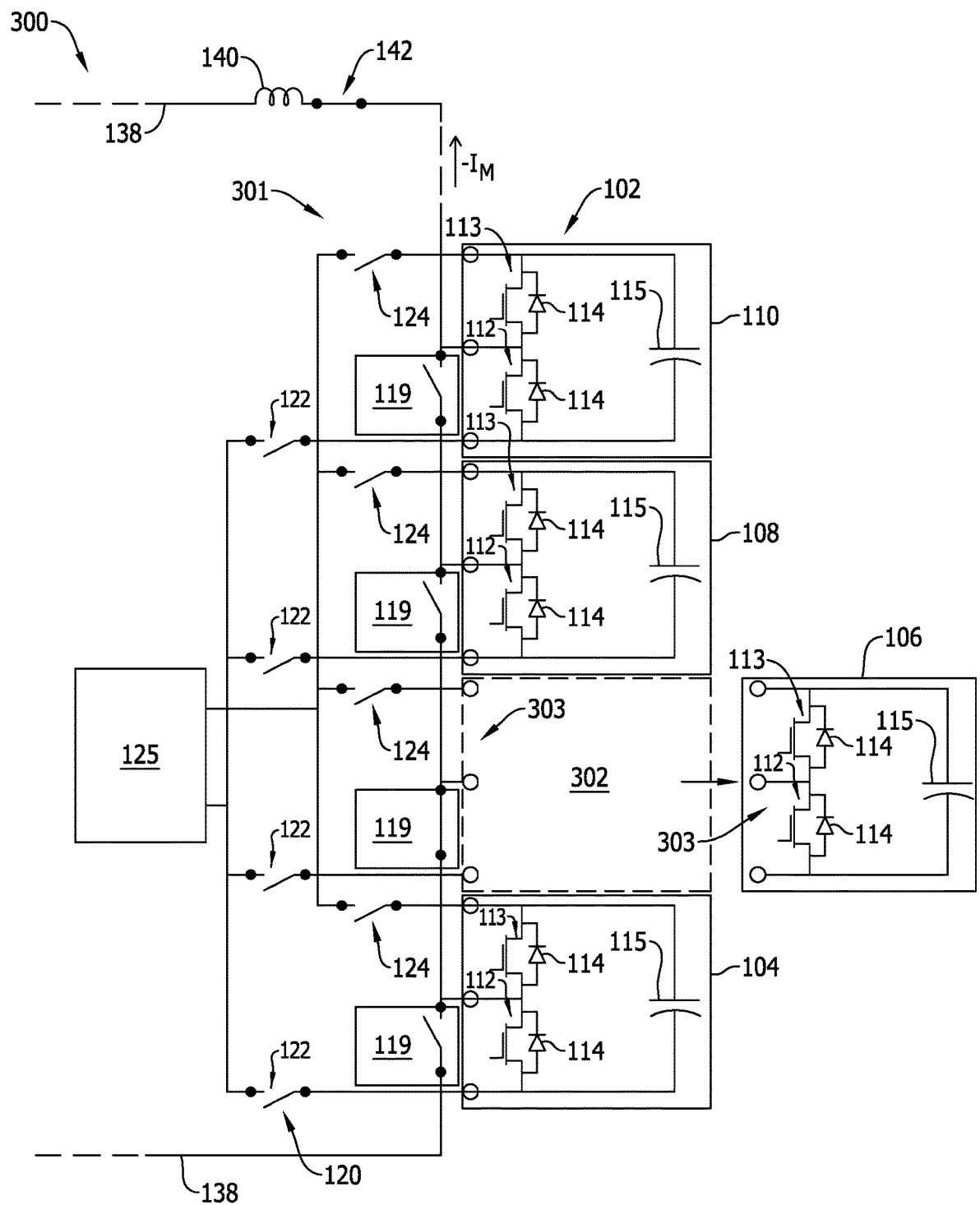
FIG. 3 is a schematic diagram of an alternative embodiment of an APLM string that may be used with the modular power converter system shown in FIG. 1.

FIG. 3 is a schematic diagram of an alternative embodiment of an APLM string 300 that may be used with modular power converter system 100 (shown in FIG. 1). In the alternative embodiment, each APLM 102 of plurality of APLMs 102 is embodied in a replaceable APLM 102 (i.e., a replaceable module) which is detachably electrically coupled to APLM string 300 and modular power converter system 100. Second APLM 106 has at least one of the non-functional and the discharged status, as shown and described above with reference to FIG. 2. Switching controller, not shown, maintains bypass switch 119 in the closed position to electrically isolate second APLM 106 from APLM string 300 and modular power converter system 100. At least one of prior to and simultaneously with removal of second APLM 106 from APLM string 300, switching controller 144 maintains first relay 122 and second relay 124 of second APLM 106 in the open position, thereby electrically isolating second APLM 106 from charge controller 125. Second APLM 106 with discharged first-type ESD 115 is removed from APLM string 300 and modular power converter system 100, leaving a module slot 302 into which a replacement APLM, not shown, is insertable, as shown and described below with reference to FIG. 4. Thus, modular power converter system 100 includes at least one module slot 302, and at least one APLM 102 of plurality of APLMs 102 is embodied in a replaceable module detachably electrically coupled module slot 302 through a plurality of connectors 303. APLM string 300 remains electrically coupled to modular power converter system 100 despite the absence of second APLM 106 therefrom. With bypass switch 119 for second APLM 106, now removed, maintained in the closed position by switching controller 144, APLM string 300 continues to function in modular power converter system 100 without a substantial interruption, but with a lesser load supportive module current ($-I_M$) capacity given the absence of second APLM 102.

Figure 4:
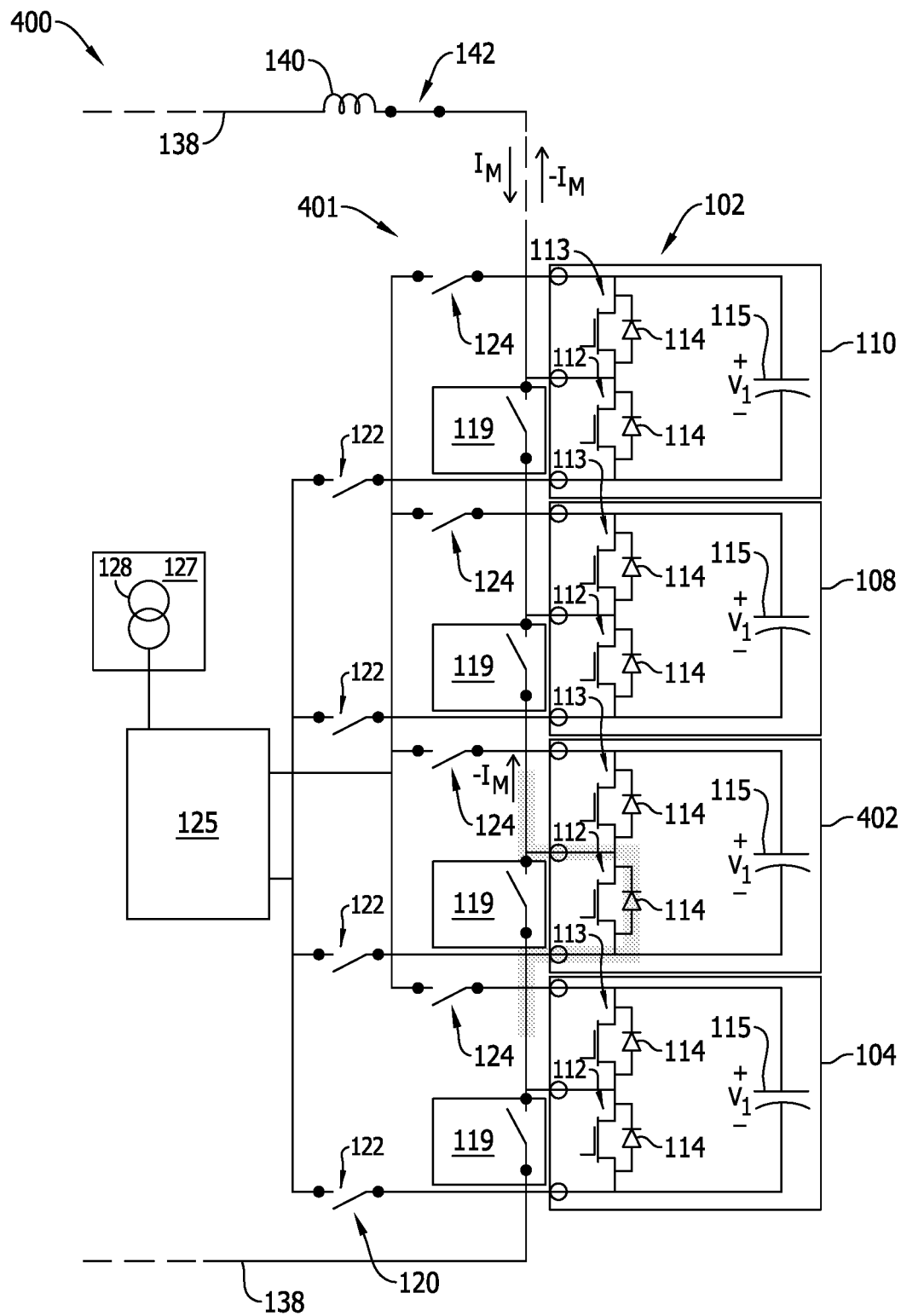
FIG. 4 is a schematic diagram of another alternative embodiment of an APLM string that may be used with the modular power converter system shown in FIG. 1.
Figure 5:
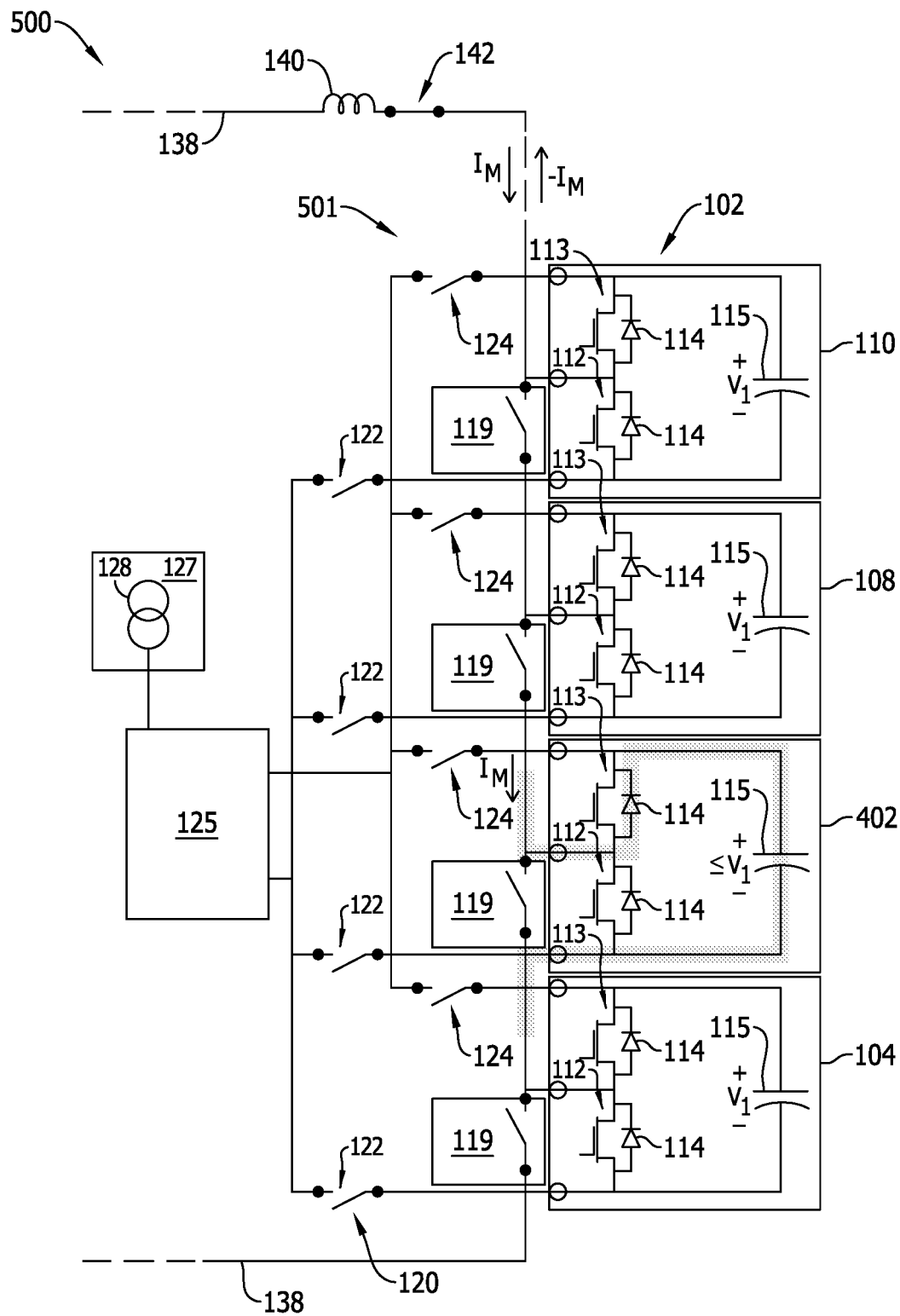
FIG. 5 is a schematic diagram of yet another alternative embodiment of an APLM string that may be used with the modular power converter system shown in FIG. 1.

FIG. 4 is a schematic diagram of another alternative embodiment of an APLM string 400 that may be used with modular power converter system 100 (shown in FIG. 1). FIG. 5 is a schematic diagram of an alternative embodiment of yet another APLM string 500 that may be used with modular power converter system 100 (shown in FIG. 1). In the alternative embodiment, a replacement APLM 402 having the functional operational status is inserted into module slot 302, not shown, and electrically coupled to APLM string 400 and modular power converter system 100. Replacement APLM 402 has at least one of a discharged charge status and the undercharged charge status prior to insertion into module slot 302. Therefore, prior to APLM string 400 having the ability to provide a full capacity load supportive module current ($-I_M$), first-type ESD 115 of replacement APLM 402 must be charged such that replacement APLM 402 acquires the charged charge status in addition to having the functional operational status.

Also, in the alternative embodiment, switching controller 144, not shown, implements a pulse width modulation (PWM)-based charging scheme as part of the control scheme of modular power converter system 100 to charge first-type ESD 115 of replacement APLM 402 to a voltage substantially equal to $V_1$. Prior to being fully charged, however, first-type ESD 115 of replacement APLM 402 has a voltage potential less than $V_1$. PWM charging scheme facilitates quickly charging first-type ESD 115 of replacement APLM 402 to a voltage potential substantially equal to $V_1$, after which switching controller 144 and charge controller 125 resumes normal operation in modular power converter system 100 (as shown and described above with reference to FIG. 1). In other embodiments, not shown, switching controller 144 is programmed, e.g., in the control logic of switching controller 144 in at least one of software and firmware, to utilize PWM scheme and charge controller 125 in unison to speed up the charging process of first-type ESD 115 of replacement APLM 402, i.e., by alternately energizing and de-energizing first relay 122 and second relay 124 at an appropriately timed interval.

Further, in the alternative embodiment, PWM charging scheme facilitates controlled and appropriately timed switching of first switching device 112 and second switching device 113 of replacement APLM 402 until such time that first-type ESD 115 thereof reaches a voltage potential substantially equal to $V_1$. During the times that switching controller 144 implements PWM charging scheme for replacement APLM 402, first-type ESDs 115 of first APLM 104, third APLM 108, and fourth APLM 110 are maintained at voltage potentials substantially equal to $V_1$ and they continue to function in providing load supportive module current ($-I_M$) as needed with switching controller 144 maintaining plurality of switching states as shown and described above with reference to FIG. 1.

In operation, in the alternative embodiment, during such times when switching controller 144 determines that load supportive module current ($-I_M$) is not required for a predetermined requisite amount of time, switching controller 144 initiates PWM charging scheme. PWM charging scheme is embodied in a modified PWM scheme whereby module current is allowed to flow in the $-I_M$ direction (as indicated in FIGS. 4 and 5) through replacement APLM 402 by maintaining bypass switch 119, first switching device 112, and second switching device 113 of replacement APLM 402 in open positions (i.e., in states which disable flow of electrical current therethrough), and the switching duty ratio is 1. In other embodiments, not shown, switching controller 144 maintains bypass switch 119 of replacement APLM 402 closed (i.e., enabling flow of electrical current therethrough), and maintains first switching device 112 and second switching device 113 open to allow flow of module current through replacement APLM 402 in the $-I_M$ direction without allowing discharging of first-type ESD 115 thereof. Thus, as shown by a first shaded current path in FIG. 4, module current flows through replacement APLM 402 in the $-I_M$ direction only through anti-parallel diode 114 of first switching device 112, and first-type ESD 115 of replacement APLM 402 is not permitted to contribute electrical current to $-I_M$ module current flow. During such times in modified PWM scheme, first-type ESD 115 of replacement APLM 402 maintains a voltage potential less than $V_1$.

Also, in operation, modified PWM scheme implemented by switching controller 144 alternately changes the direction of flow of module current to a direction opposite $-I_M$ (i.e., $I_M$). During such times when module current flows in the $I_M$ direction through plurality of APLMs 102 including replacement APLM 402, modified PWM charging scheme implemented by switching controller 144 maintains bypass switch 119, first switching device 112, and second switching device 113 of replacement APLM 402 again in open positions, and the switching duty ratio is 0 (zero). Thus, as shown by a second shaded current path in FIG. 5, module current flows through replacement APLM 402 in the $I_M$ direction only through anti-parallel diode 114 of second switching device 113, and first-type ESD 115 of replacement APLM 402 is charged to a voltage potential higher than the voltage potential it had during those times of modified PWM charging scheme it experienced with module current flow in the $-I_M$ direction.

Further, in operation, switching controller 144 is also configured to interrupt modified PWM charging scheme if it determines that load supportive module current $-I_M$ is required by at least one of electrical load device 136 and second-type ESD 132, e.g., to support load transients and to charge second-type ESD 132 if at least one of charge controller 125 and electrical power source 127 is unavailable. Modified PWM charging scheme is resumed by switching controller 144 after $-I_M$ load supportive module current is no longer needed, and charging of first-type ESD 115 of replacement APLM 402 continues until it reaches a voltage potential substantially equal to $V_1$. Upon reaching first-type ESD 115 of replacement APLM 402 reaching a voltage potential substantially equal to $V_1$, switching controller 144 ends modified PWM charging scheme, and resumes maintenance of plurality of switching states in modular power converter system 100 as shown and described above with reference to FIG. 1.

Figure 6:
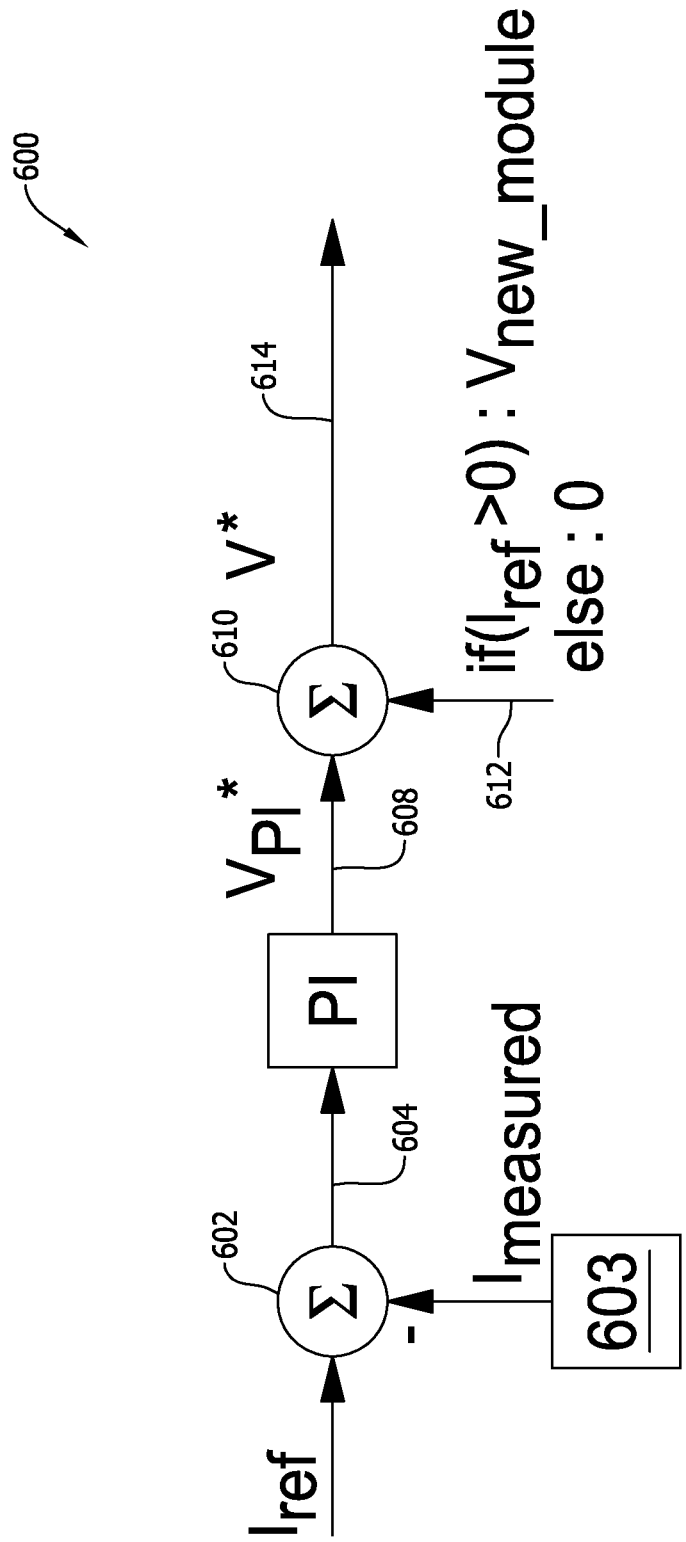
FIG. 6 is a schematic diagram of an exemplary control scheme that may be used with the modular power converter system shown in FIG. 1.

FIG. 6 is a schematic diagram of an exemplary control scheme 600 that may be used with modular power converter system 100 (shown in FIG. 1). In the exemplary embodiment, control scheme 600 is implemented by switching controller 114 and governs power flow through modular power converter system 100 based on a time average voltage (i.e., $V_1$) of first-type ESD 115 in each APLM 102 of plurality of APLMs 102. A first summer module 602 determines a difference between a pre-determined reference string current (i.e., $I_{ref}$) and an inductor current (i.e., $I_{measured}$) flowing through at least one of DC bus 138 and inductor 140 and measured by, for example, an ammeter 603 coupled thereto. First summer module 602 outputs a difference signal 604 to a proportional integrator (PI) module 606. If a value of difference signal 604 is at least one of substantially equal to 0 amps (A) and within a pre-determined tolerance range (i.e., ±%) spanning 0 A, PI module 606 does not change (i.e., at least one of increase and decrease) at least one of $V_1$ of first-type ESD 115 and a magnitude of module current (i.e., $I_M$) of each APLM 102 of plurality of APLMs 102. If, on the other hand, the value of difference signal 604 at least one of not substantially equal to 0 A and not within the predetermined tolerance range spanning 0 A, PI module 606 outputs a PI control signal 608 to a second summer module 610.

In operation, in the exemplary embodiment, PI control signal 608 has a value (i.e., $V_{PI}^*$) which is representative of a change in at least one of $V_1$ of first-type ESD 115 and the magnitude of $I_M$ to be implemented in each APLM 102 of plurality of APLMs 102 so that a target value of $I_{ref}$ is at least one of attained and maintained in modular power converter system 100. Second summer module 610 receives PI control signal 608 from PI module 606 along with a new module signal 612. New module signal 612 has a value (i.e., $V_{new\_module}$) representative of a charge status of first-type ESD 115 in replacement APLM 402 undergoing charging through modified PWM charging scheme (as shown and described above with reference to FIGS. 4 and 5). New module signal 612 thus functions as a feed-forward term in control scheme 600, and its value $V_{new\_module}$ is added to the value of $V_{PI}^*$ by second summer module 610. A summed output signal 614 of second summer module 610 has a value (i.e., $V^*$) representative of an effective change in voltage of first-ESDs 115 to be implemented by control scheme 600 in those APLMs 102 of the plurality of APLMs 102 other than replacement APLM 402.

Also, in operation, in cases where each APLM 102 of plurality of APLMs 102 has both the functional operational status and the charged charge status, summed output signal 614 is substantially equal to $V_{PI}^*$ and effects the necessary changes to each first-type ESD 115 of each APLM 102 of plurality of APLMs 102 to attain $I_{ref}$. However, where at least one replacement APLM 402 is present among plurality of APLMs 102 and is undergoing at least one of charging and discharging (as shown and described above with reference to FIGS. 2-5), summed output signal 614 includes feed-forward term $V_{new\_module}$ and effects necessary changes to attain $I_{ref}$ target value only in those APLM(s) 102 which are not undergoing at least one of charging and discharging. Thus, inclusion of feed-forward term $V_{new\_module}$ and second summer module 610 facilitates cancellation of undesirable voltage and current disturbances on DC bus 138 caused by switching in and out first-type ESD 115 of replacement APLM 402 which has a different $V_1$ value from other first-type ESDs 115, and whose first switching device 112 and second switching device 113 is under a different controlled switching scheme (i.e., modified PWM charging scheme) than other APLMs 102 of plurality of APLMs 102.

Figure 7:
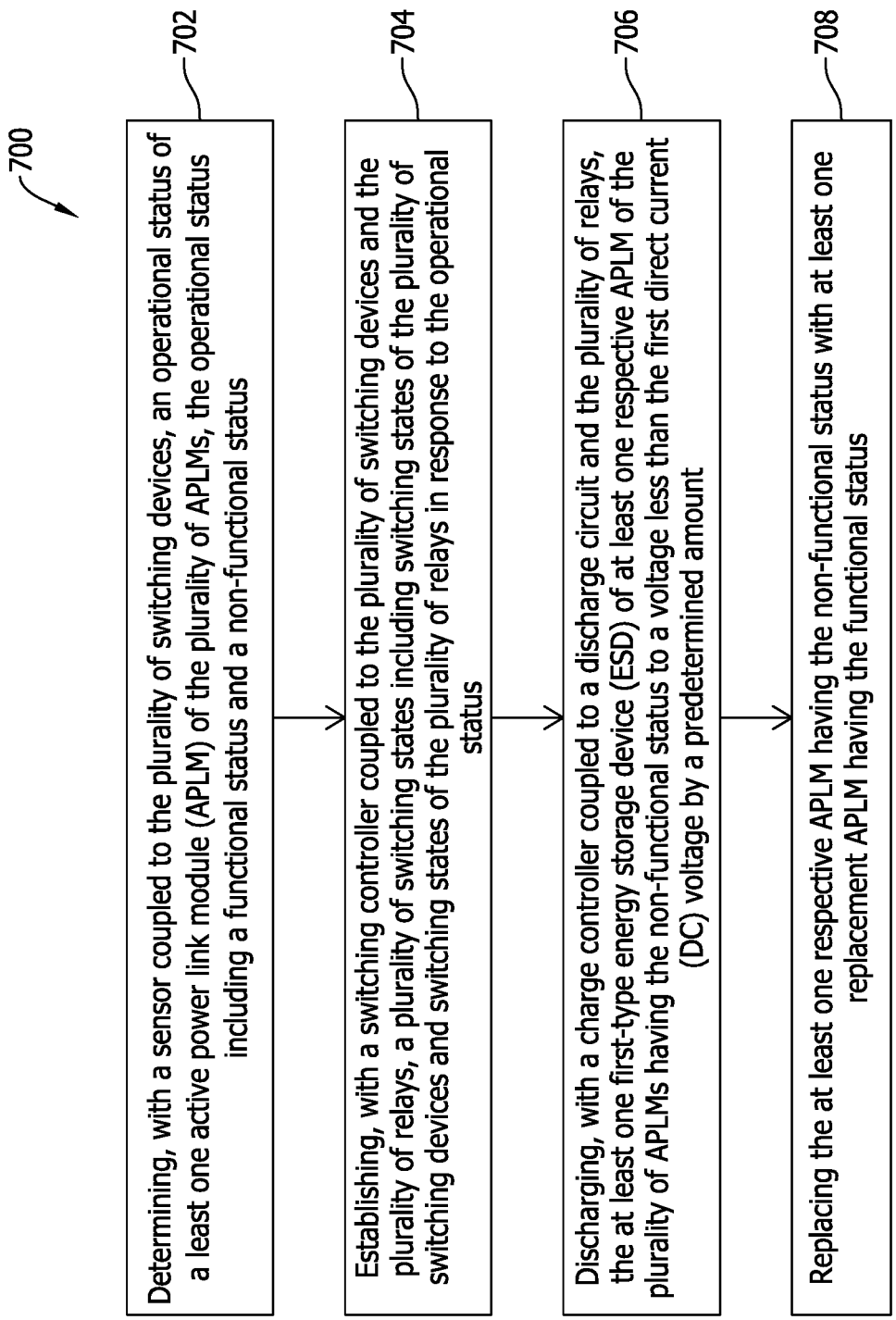
FIG. 7 is a flowchart diagram of an exemplary method of operating a modular power converter system that may be used with the modular power converter system shown in FIG. 1.

FIG. 7 is a flowchart diagram of an exemplary method 700 of operating a modular power converter system that may be used with modular power converter system 100 (shown in FIG. 1). In the exemplary embodiment, method 700 includes determining 702, with sensor 116 coupled to first switching device 112 and second switching device 113, an operational status of at least one APLM 102 of plurality of APLMs 102, the operational status including a functional status and a non-functional status. Method 700 also includes establishing 704, with switching controller 144 coupled to first switching device 112, second switching device 113, and plurality of relays 120, a plurality of switching states including switching states of first switching device 112 and second switching device 113, and switching states of plurality of relays 120, in response to the operational status. Method 700 further includes discharging 706, with charge controller 125 coupled to discharge circuit 130 and coupled to plurality of relays 120, first-type ESD 115 of at least one respective APLM 102 of plurality of APLMs 102 having the non-functional status to a voltage less than $V_1$ by a predetermined amount. Method 700 also includes replacing 708 the at least one respective APLM 102 having the non-functional status with at least one replacement APLM 402 having the functional status.

Figure 8:
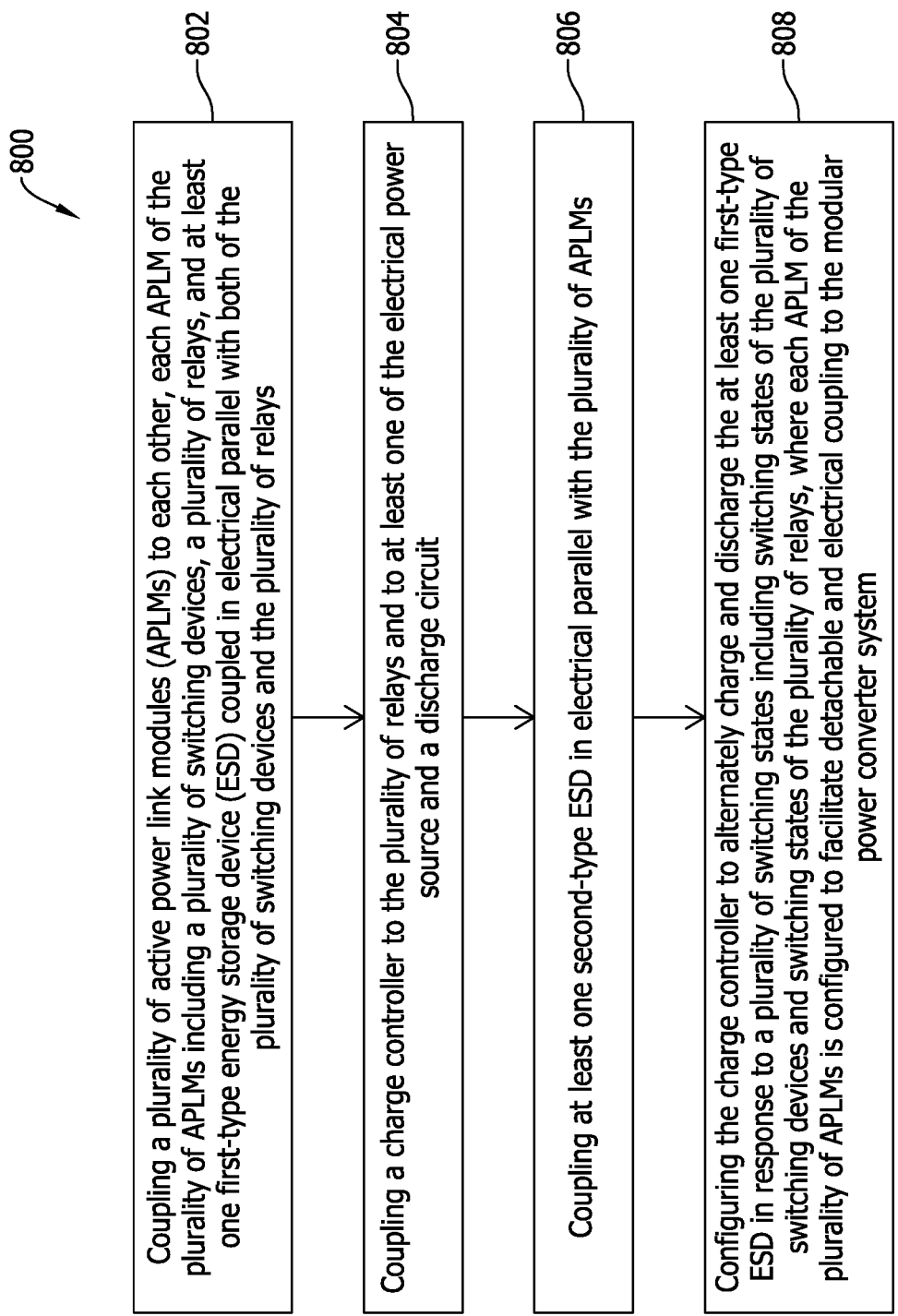
FIG. 8 is a flowchart diagram of an exemplary method of assembling a modular power converter system that may be used with the modular power converter system shown in FIG. 1.

FIG. 8 is a flowchart diagram of an exemplary method 800 of assembling a modular power converter system that may be used with modular power converter system 100 (shown in FIG. 1). In the exemplary embodiment, method 800 includes coupling 802 plurality of APLMs 102 to each other. Method 800 also includes coupling 804 charge controller 125 to plurality of relays 120 and to at least one of electrical power source 127 and discharge circuit 130. Method 800 further includes coupling 806 second-type ESD 132 in electrical parallel with plurality of APLMs 102. Method 800 also includes configuring 808 charge controller 125 to alternately charge and discharge first-type ESD 115 in response to plurality of switching states including switching states of plurality of switching devices (i.e., first switching device 112 and second switching device 113) and switching states of plurality of relays 120, where each APLM 102 of plurality of APLMs 102 is configured to facilitate detachable electrical coupling to modular power converter system 100.

The above-described systems and methods for charging and discharging APLMs in DC power systems enable a reduction in operational downtime of electrical load devices supported by ESDs, e.g., ultracapacitors, relative to known systems. The above-described embodiments also provide simplified and low cost maintenance and operation of DC power systems. Further, the above-described embodiments further enable integration of ESD charging and discharging functionality and control on a system-wide basis to minimize the number of separate components and steps required by users, and reduce the risk of equipment damage. The above-described systems and methods for charging and discharging APLMs in DC power systems also provide modularity including simply and quickly implementable LRUs that are configurable in widely varying designs in a number of voltage levels to suit particular applications.

An exemplary technical effect of the above-described systems and methods for charging and discharging APLMs in DC power systems includes at least one of the following: (a) enabling reduction in operational downtime of electrical load devices supported by ESDs relative to known systems; (b) providing simplified and low cost maintenance of DC power systems; (c) enabling integration of ESD charging and discharging functionality and control on a system-wide basis to minimize the number of separate components and steps required by users, and reduce the risk of equipment damage; and (d) providing modularity including simply and quickly implementable LRUs that are configurable in widely varying designs in a number of voltage levels to suit particular applications.

Exemplary embodiments of systems and methods for charging and discharging APLMs in DC power systems, and methods of operating such systems and devices are not limited to the specific embodiments described herein, but rather, components of systems and/or steps of the methods may be utilized independently and separately from other components and/or steps described herein. For example, the systems may also be used in combination with other systems requiring modularity, scalability, and redundancy in design and operation, and the associated methods, and are not limited to practice with only the systems and methods for charging and discharging APLMs in DC power systems as described herein. Rather, the exemplary embodiment can be implemented and utilized in connection with many other power systems applications that are currently configured to provide high efficiency DC power conversion using ESDs such as ultracapacitors that require periodic charging and discharging, e.g., and without limitation, power systems in renewable energy generation facilities.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modular power converter system comprising:
 a plurality of active power link modules (APLMs) directly coupled to each other, each APLM of said plurality of APLMs comprising:
 a plurality of switching devices comprising a first switching device and a second switching device being coupled to each other in electrical series and an antiparallel diode being coupled in electrical parallel to each of the first switching devices and each of the second switching devices; and
 at least one first-type energy storage device (ESD) of a plurality of first-type energy storage devices (ESDs) being coupled in electrical parallel with a series connection of said first switching device and said second switching device, said at least one first-type ESD configured to induce a first direct current (DC) voltage;

a plurality of relays including a plurality of first relays and a plurality of second relays corresponding to the plurality of first-type ESDs wherein for each APLM, a first relay of the plurality of first relays is coupled to a first terminal of said at least one first-type ESD proximate said first switching device and a second relay of the plurality of second relays is coupled to a second terminal of said at least one first-type ESD proximate said second switching device;

a switching controller coupled to the plurality of switching devices and coupled to the plurality of relays and configured to facilitate determination of an operational status and switching status of each APLM of the plurality of APLMs by establishing a plurality of switching states including switching states of the plurality of switching devices and switching states of the plurality of relays in response to the operational status of each APLM of the plurality of APLMs; and a charge controller coupled to at least one APLM of said plurality of APLMs via said first relay and said second relay, said charge controller further coupled to the switching controller and at least one of an electrical power source and a discharge circuit, said charge controller configured to receive at least one charge control signal from the switching controller and to alternately charge and discharge said at least one first-type ESD of at least one respective APLM of the plurality of APLMs in response to the switching states of the plurality of switching devices and the plurality of relays, having a non-functional status to a voltage less than a first DC voltage by a predetermined amount to thereby replace the at least one respective APLM having a non-functional status with at least one replacement APLM having a functional status.

2. The modular power converter system in accordance with claim 1 further comprising at least one module slot, wherein said at least one APLM comprises a replaceable module detachably electrically coupled to said at least one module slot through a plurality of connectors.

3. The modular power converter system in accordance with claim 1 further comprising at least one electrical load device coupled in electrical parallel with said plurality of APLMs.

4. The modular power converter system in accordance with claim 1, wherein said charge controller comprises a bi-directional DC-to-alternating current (AC) power converter coupled to at least one of said electrical power source and said discharge circuit.

5. The modular power converter system in accordance with claim 1, wherein said charge controller is further configured to at least one of: maintain said at least one first-type ESD at a voltage substantially equal to the first DC voltage; charge said at least one first-type ESD to a voltage substantially equal to the first DC voltage upon the voltage of said at least one first-type ESD falling below the first DC voltage by a predetermined amount; and discharge said at least one first-type ESD to a predetermined voltage less than the first DC voltage.

6. The modular power converter system in accordance with claim 1, wherein at least one APLM of said plurality of APLMs further comprises:

at least one sensor coupled to at least one of said at least one first-type ESD and said plurality of switching devices, said at least one sensor configured to detect at least one of: an operational status including a functional status and a non-functional status of at least one switching device of said plurality of switching devices; and a charge status including a charged status and a discharged status of said at least one first-type ESD; and at least one indicator coupled to said at least one sensor, said at least one indicator configured to facilitate distinguishing between at least one respective APLM of said plurality of APLMs having at least one of the functional status and the charged status and at least one respective APLM of said plurality of APLMs having at least one of the non-functional status and the discharged status.

7. The modular power converter system in accordance with claim 1 further comprising at least one second-type ESD coupled in electrical parallel with said plurality of APLMs, said at least one second-type ESD configured to induce a second DC voltage.

8. The modular power converter system in accordance with claim 7 further comprising at least one electrical load device coupled in electrical parallel with said plurality of APLMs.

9. The modular power converter system in accordance with claim 7, wherein said charge controller is further coupled to said at least one second-type ESD, said charge controller further configured to at least one of: maintain said at least one second-type ESD at a voltage substantially equal to the second DC voltage; charge said at least one second-type ESD to a voltage substantially equal to the second DC voltage upon the voltage of said at least one second-type ESD falling below the second DC voltage by a predetermined amount; and discharge said at least one second-type ESD to a predetermined voltage less than the second DC voltage.

10. The modular power converter system in accordance with claim 1 further comprising a bypass switch coupled in electrical parallel with at least one switching device of said plurality of switching devices, said bypass switch configured to alternately electrically couple and electrically isolate said at least one APLM of said plurality of APLMs and said modular power converter system, wherein the plurality of switching states further includes switching states of said bypass switch.

11. The modular power converter system in accordance with claim 10 wherein the switching controller is further coupled to said bypass switch, said switching controller configured to transmit at least one switch control signal to alternately open and close at least one of said bypass switch and said plurality of switching devices, said switching controller further configured to alternately energize and de-energize said plurality of relays to further establish the plurality of switching states wherein the switching controller is further configured to maintain the bypass switch in an open position and maintain the plurality of relays in an open position wherein the plurality of relays are in a de-energized condition which disables flow of electrical current through the plurality of relays.

12. The modular power converter system in accordance with claim 11, wherein at least one APLM of said plurality of APLMs further comprises at least one sensor coupled to at least one of said at least one first-type ESD and said plurality of switching devices, said at least one sensor configured to detect at least one of: an operational status including a functional status and a non-functional status of at least one switching device of said plurality of switching devices; and a charge status including a charged status and a discharged status of said at least one first-type ESD, said at least one sensor further configured to transmit a status signal to at least one of said switching controller and said charge controller to facilitate at least one of: distinguishing between at least one respective APLM of said plurality of APLMs having at least one of the functional status and the charged status and at least one respective APLM of said plurality of APLMs having at least one of the non-functional status and the discharged status; and closing said bypass switch of said at least one respective APLM having at least one of the non-functional status and the discharged status.

13. A method of operating a modular power converter system including a plurality of active power link module (APLMs) directly coupled to each other, each APLM of the plurality of APLMs including a plurality of relays including a plurality of first relays and a plurality of second relays corresponding to a plurality of first-type ESDs, a plurality of switching devices coupled in electrical series and an antiparallel diode being coupled in electrical parallel with the plurality of switching devices, and at least one first-type energy storage device (ESD) of the plurality of first-type energy storage devices (ESDs) being coupled in electrical parallel with a series connection of the plurality of switching devices, the at least one first-type ESD configured to induce a first direct current (DC) voltage, wherein for each APLM, a first relay of the plurality of first relays is coupled to a first terminal of the at least one first-type ESD proximate a first switching device of the plurality of switching devices and a second relay of the plurality of second relays is coupled to a second terminal of the at least one first-type ESD proximate a second switching device of the plurality of switching devices, said method comprising:
   determining, with a sensor coupled to the plurality of switching devices, an operational status of at least one APLM of the plurality of APLMs, the operational status including a functional status and a non-functional status;
   establishing, with a switching controller coupled to the sensor and to the plurality of switching devices and to the plurality of relays, a plurality of switching states including switching states of the plurality of switching devices and switching states of the plurality of relays in response to the operational status;
   discharging, with a charge controller coupled to the switching controller and to a discharge circuit and the plurality of relays, the at least one first-type ESD of at least one respective APLM of the plurality of APLMs having the non-functional status to a voltage less than the first DC voltage by a predetermined amount the charge controller coupled to the at least one respective APLM via the first relay and the second relay; and
   replacing the at least one respective APLM having the non-functional status with at least one replacement APLM having the functional status.

14. The method in accordance with claim 13 further comprising charging, with the charge controller further coupled to an electrical power source, the at least one first-type ESD of the at least one replacement APLM to a voltage substantially equal to the first DC voltage.

15. The method in accordance with claim 13 further comprising maintaining, with the charge controller further coupled to an electrical power source, at least one respective APLM of the plurality of APLMs having the functional status at a voltage substantially equal to the first DC voltage.

16. The method in accordance with claim 13, wherein the modular power converter system further includes at least one second-type ESD coupled to the plurality of APLMs, the at least one second-type ESD configured to induce a second DC voltage, said method further comprising:
   determining a charge status of the at least one second-type ESD, the charge status including a charged status, an undercharged status, and an overcharged status;
   maintaining, with at least one of the switching controller and the charge controller, the at least one second-type ESD having the charged status at a voltage substantially equal to the second DC voltage;
   charging, with the charge controller further coupled to an electrical power source, the at least one second-type ESD having the undercharged status to a voltage substantially equal to the second DC voltage; and discharging, with the charge controller coupled to the discharge circuit, the at least one second-type ESD having the overcharged status to a voltage less than the second DC voltage by a predetermined amount.

17. The method in accordance with claim 13, wherein the plurality of switching devices includes a first switching device and a second switching device coupled to each other in electrical series, and wherein charging the at least one first-type ESD of the at least one replacement APLM comprises:
   establishing, with the switching controller, a first APLM switching state configured to enable a flow of electrical current through the plurality of APLMs in a first direction; and
   establishing, with the switching controller, a second APLM switching state configured to enable the flow of electrical current through the plurality of APLMs in a second direction opposite the first direction.

18. The method in accordance with claim 13, wherein replacing the at least one respective APLM having the non-functional status with at least one replacement APLM having the functional status comprises:
   removing the at least one respective APLM having the non-functional status from the modular power converter system; and
   inserting the at least one replacement APLM having the functional status at the location in the modular power converter system from which the at least one respective APLM having the non-functional status was removed.

19. The method in accordance with claim 13, wherein the modular power converter system further includes a bypass switch coupled to at least one switching device of the plurality of switching devices, said method further comprising maintaining, with the switching controller, the bypass switch in an open position and maintaining the plurality of relays in a de-energized condition which disables flow of electrical current through the plurality of relays, in each respective APLM of the at least one respective APLM having the functional status.

20. The method in accordance with claim 19, wherein discharging the at least one first-type ESD comprises maintaining, with the switching controller, the bypass switch in a closed position and maintaining the plurality of relays in an energized condition in each respective APLM of the at least one respective APLM having the non-functional status.

21. The method in accordance with claim 19, wherein establishing the plurality of switching states comprises establishing, with the switching controller:
   a first switching state configured to maintain the bypass switch in an open position and maintain the plurality of relays in a de-energized condition which disables flow of electrical current through the plurality of relays, in each respective APLM of the at least one respective APLM having the functional status; and a second switching state configured to maintain the bypass switch in a closed position in each respective APLM of the at least one respective APLM having the non-functional status.

22. The method in accordance with claim 19 further comprising:
   determining a charge status of the at least one first-type ESD, the charge status including a charged status, an undercharged status, and an overcharged status;
   maintaining, with at least one of the switching controller and the charge controller, the at least one first-type ESD having the charged status at a voltage substantially equal to the first DC voltage;
   charging, with the charge controller further coupled to an electrical power source, the at least one first-type ESD having the undercharged status to a voltage substantially equal to the first DC voltage; and
   discharging, with the charge controller coupled to the discharge circuit, the at least one first-type ESD having the overcharged status to a voltage less than the first DC voltage by a predetermined amount, wherein discharging the at least one first-type ESD of the at least one respective APLM having the non-functional status comprises establishing, with the switching controller, a third switching state configured to maintain the bypass switch in a closed position and maintain the plurality of relays in an energized condition in each respective APLM of the at least one APLM having at least one of the non-functional status, the charged status, the undercharged status, and the overcharged status.

23. A method of assembling a modular power converter system, said method comprising:
   directly coupling a plurality of active power link modules (APLMs) to each other, each APLM of the plurality of APLMs including a plurality of switching devices coupled in electrical series and an antiparallel diode being coupled in electrical parallel with the plurality of switching devices, a plurality of relays including a plurality of first relays and a plurality of second relays corresponding to a plurality of first-type ESDs, and at least one first-type energy storage device (ESD) of the plurality of first-type ESDs coupled in electrical parallel with a series connection of the plurality of switching devices, wherein for each APLM, a first relay of the plurality of first relays coupled to a first terminal of the at least one first-type ESD proximate a first switching device of the plurality of switching devices and a second relay of the plurality of second relays coupled to a second terminal of the at least one first-type ESD proximate a second switching device of the plurality of switching devices;
   coupling a charge controller to a switching controller, to the first relay and the second relay of the plurality of relays and to at least one of an electrical power source and a discharge circuit;
   coupling at least one second-type ESD in electrical parallel with the plurality of APLMs; and
   configuring the charge controller to alternately charge and discharge via at least one charge control signal received from the switching controller, the at least one first-type ESD in response to a plurality of switching states including switching states of the plurality of switching devices and switching states of the plurality of relays, wherein each APLM of the plurality of APLMs is configured to facilitate detachable electrical coupling to the modular power converter system.

* * * * *